US010317107B2

United States Patent
Nemoto (10) Patent No.: US 10,317,107 B2
(45) Date of Patent: Jun. 11, 2019

(54) AIRFLOW-DIRECTION ADJUSTMENT DEVICE

(71) Applicant: NIFCO INC., Yokosuka-shi, Kanagawa (JP)

(72) Inventor: Takehiko Nemoto, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 289 days.

(21) Appl. No.: 15/037,495

(22) PCT Filed: Nov. 18, 2014

(86) PCT No.: PCT/JP2014/080492
§ 371 (c)(1),
(2) Date: May 18, 2016

(87) PCT Pub. No.: WO2015/076254
PCT Pub. Date: May 28, 2015

(65) Prior Publication Data
US 2016/0282008 A1    Sep. 29, 2016

(30) Foreign Application Priority Data
Nov. 20, 2013    (JP) .................. 2013-239461

(51) Int. Cl.
*B60H 1/34*    (2006.01)
*F24F 13/06*    (2006.01)
(Continued)

(52) U.S. Cl.
CPC ........... *F24F 13/06* (2013.01); *B60H 1/3421* (2013.01); *B60H 1/3442* (2013.01); *B64D 13/00* (2013.01);
(Continued)

(58) Field of Classification Search
CPC ...... F24F 13/06; F24F 13/065; B60H 1/3421; B60H 1/3442; B60H 2001/3478; B64D 2013/003
(Continued)

(56) References Cited

U.S. PATENT DOCUMENTS 3,420,448 A * 1/1969 Snow .................... F24F 13/065
239/569
3,432,142 A * 3/1969 Ludford ............... B60H 1/3442
251/212
(Continued)

FOREIGN PATENT DOCUMENTS

CN    2239595 Y    11/1996
CN    1285288 A    2/2001
(Continued)

OTHER PUBLICATIONS

PCT International Search Report of PCT/JP2014/080492.
(Continued)

*Primary Examiner* — Steven B McAllister
*Assistant Examiner* — Frances F. Hamilton
(74) *Attorney, Agent, or Firm* — Manabu Kanesaka (57) ABSTRACT

An airflow-direction adjustment device includes a housing in which a front end side is set as an air outlet and a back end side is set as an air inlet; a fin turnably supported inside the housing; and a gear mechanism for adjusting a direction of the fin by a rotation of an operating portion. An essential part is formed such that the fin is formed by a pair of vanes disposed on right and left or top and bottom inside the housing, and each vane is turnably supported in a front-and-back direction of the housing respectively as a supporting point on a common pivot line set in a plate width direction.

1 Claim, 9 Drawing Sheets

(51) Int. Cl.
*F24F 13/065* (2006.01)
*B64D 13/00* (2006.01)

(52) U.S. Cl.
CPC .... *F24F 13/065* (2013.01); *B60H 2001/3478* (2013.01); *B64D 2013/003* (2013.01)

(58) Field of Classification Search
USPC ........................................................ 454/317
See application file for complete search history.

(56) References Cited

U.S. PATENT DOCUMENTS

| | | | | |
|---|---|---|---|---|
| 3,835,759 A * | 9/1974 | Lloyd | ................. | B60H 1/3442 251/352 |
| 4,006,673 A * | 2/1977 | Meyer | ................. | B60H 1/3442 251/352 |
| 4,092,907 A * | 6/1978 | Meyer | .................... | B60H 1/24 251/352 |
| 9,707,826 B2 * | 7/2017 | Brinas | ..................... | B60H 1/34 |
| 9,718,329 B2 * | 8/2017 | Brinas | ................. | B60H 1/3442 |
| 2011/0250830 A1 * | 10/2011 | Steinbeiss | ............ | B60H 1/3442 454/154 |
| 2015/0202946 A1 * | 7/2015 | Inagaki | ................ | B60H 1/3428 454/154 |
| 2015/0336445 A1 * | 11/2015 | Uehara | ................ | B60H 1/3442 454/155 |
| 2016/0129761 A1 * | 5/2016 | Brinas | .................. | B60H 1/3421 454/155 |
| 2016/0129762 A1 * | 5/2016 | Brinas | .................. | B60H 1/3428 454/155 |
| 2017/0036508 A1 * | 2/2017 | Terasawa | ............ | B60H 1/3442 |

FOREIGN PATENT DOCUMENTS

| | | | | |
|---|---|---|---|---|
| CN | 101293472 A | * | 10/2008 | |
| DE | 10223660 A1 | * | 12/2003 | ........... B60H 1/3442 |
| DE | 10 2009 041 532 B4 | | 11/2011 | |
| GB | 1385874 A | * | 3/1975 | ............ F24F 13/065 |
| GB | 1396993 A | * | 6/1975 | ........... B60H 1/3442 |
| GB | 1518976 A | * | 7/1978 | ........... B60H 1/3442 |
| JP | S60-184713 U | | 12/1985 | |
| JP | H04-302940 A | | 10/1992 | |
| JP | H08-197940 A | | 8/1996 | |
| JP | 2008-002714 A | | 1/2008 | |
| KR | 10-0306435 B1 | | 9/2001 | |

OTHER PUBLICATIONS

Europe Patent Office, "Search Report for European Patent Application No. 14863555.0," dated Jun. 22, 2017.
China Patent Office, "Office Action for Chinese Patent Application No. 201480063071.4," dated Mar. 29, 2017.

* cited by examiner

AIRFLOW-DIRECTION ADJUSTMENT DEVICE

FIELD OF TECHNOLOGY

The present invention relates to an airflow-direction adjustment device varying a flow of air toward an air outlet side through a fin in a cooling and heating equipment, air conditioning equipment, or the like, and especially varying the fin through a gear mechanism.

BACKGROUND ART

In the airflow-direction adjustment device of the subject of the present invention, an air outlet is formed in, for example, an instrument panel of an automobile, and as shown in Patent Document 1 or 2 as an example, the airflow-direction adjustment device is a type comprising a housing in which a front end side is formed as an air outlet and a back end side is formed as an air inlet; the fin turnably supported inside the housing; and the gear mechanism for adjusting a direction of the fin by a rotation of an operating portion.

The airflow-direction adjustment device of the Patent Document 1 comprises a case member which is the housing; a pair of airflow-direction-adjustment vane groups provided inside the case member; an operating portion provided on a front lower side of the case member; and a gear mechanism synchronizing each airflow-direction-adjustment vane group to vary. Also, each airflow-direction-adjustment vane group includes two pedestals turnably supported as a supporting point of a turning shaft in a vertical direction; a plurality of vanes erected on an upper face of each pedestal; and gear portions provided around each pedestal as the gear mechanism, and engaged with each other. Then, when the operating portion is rotated, each pedestal rotates in a right-and-left direction through the gear portion as the supporting point of the turning shaft to vary a direction of each vane.

The airflow-direction adjustment device of the Patent Document 2 comprises a housing opening front and back; seven fins obliquely disposed inside the housing; an operating portion provided at a front center of the housing; and a gear mechanism synchronizing each fin to vary. Also, the gear mechanism includes a first gear portion integrally rotated with a rotation of the operating portion; a second gear portion engaged with the first gear portion; a third gear portion engaging the second gear portion, and integrated into the fin; and a ring-shaped gear with which the third gear portion is engaged. Then, when the operating portion is rotated, the direction of each fin varies through the first to third gear portions and the ring-shaped gear.

PRIOR ART DOCUMENT

Patent Document

Patent Document 1: Japanese Unexamined Patent Application Publication No. H08-197940
Patent Document 2: German Patent Invention No. 102009041532 Specification (DE102009041532B4)

SUMMARY OF THE INVENTION

Problems to be Solved by the Invention

In structures of the aforementioned Patent Documents 1 and 2, the air is blown out through the air outlet in a direction according to an angle of a number of vanes or fins, or as a swirl flow so as to reasonably obtain a mild airflow blow. However, in a case of the Patent Document 1, as shown in FIG. 1 and FIG. 6 of the Patent Document 1 as an example, in order to effectively carry out an airflow-direction adjustment, the number of vanes has to be at least four or more, and a shape becomes complicated and bulky. In a case of the Patent Document 2, the number of fins increases further, and the gear mechanism synchronizing the operating portion to each fin becomes complicated as well. As a result, structurally, it is difficult to reduce the weight, and the number of parts increases or an assembly property deteriorates, thereby increasing a cost.

An object of the present invention is to solve the aforementioned problems, and easily obtain a simplified structure and reduction in weight as well as excellence in the airflow-direction adjustment. Other objects of the present invention will be clarified in the following explanation of contents.

Means for Solving the Problems

In order to obtain the aforementioned objects, the present invention provides an airflow-direction adjustment device comprising a housing in which a front end side is set as an air outlet and a back end side is set as an air inlet; a fin turnably supported inside the housing; and a gear mechanism for adjusting a direction of the fin by a rotation of an operating portion, and the aforementioned fin is formed by a pair of vanes disposed on right and left or top and bottom inside the housing, and each vane is turnably supported in a front-and-back direction of the housing respectively as a supporting point on a common pivot line N set in a plate width direction.

Here, as for the "housing", for example, the housing is formed by a cylinder shape in which the fin can be disposed, and wherein a front end side which is a just-in-front side is set as the air outlet, and an opposite back end side is set as the air inlet side. In the housing, a frame member shown in an embodiment may be omitted, and there may be added an attachment portion and the like. The "fin" is formed by the pair of vanes disposed inside the housing. The pair of vanes is not limited to the same shape as in the embodiment, and includes an aspect having a different shape. Also, the pair of vanes may be an embodiment wherein the housing of the embodiment is rotated approximately by 90 degrees, i.e. an aspect disposed on the top and bottom inside the housing in addition to an aspect disposed on the right and left inside the housing as in the embodiment.

In the aforementioned present invention, it is more preferable to be embodied as specified in the following.

(1) A structure includes such that the vanes are switched from a closed state rotated relatively in the opposite directions through the gear mechanism to almost inhibit a flow of air from the aforementioned air inlet side toward the air outlet side, to an open state allowing the flow of air and varying an airflow direction. In the preferred embodiment, even with a small number of vanes for an airflow-direction adjustment, the vanes can multilaterally vary.

(2) In a structure, the gear mechanism includes a gear portion provided on the pivot line of each vane; and a gear integrally rotated with the operating portion to engage the gear portion of each vane. In the preferred embodiment, as the gear mechanism allowing a plurality of vanes to turn in synchronization with the rotation of the operating portion, the pair of vanes can be easily rotated in the opposite directions. Also, compared to the Patent Document 2, the gear mechanism can be simplified, and can easily maintain an excellent engagement state compared to the structure wherein both gear portions of each pedestal are directly engaged as in the Patent Document 1.

(3) In a structure, the housing has an approximately spherical shape, and opens at front and back ends, and an inner portion is divided into two by a division plate up to a vicinity on the pivot line from the air inlet side. In the preferred embodiment, even if there are two vanes for the airflow-direction adjustment, the vanes can more multilaterally vary. Specifically, in addition to a change of the airflow direction on a curved surface inside the housing, the airflow direction can vary in an X direction, and furthermore, a mild swirl flow can be easily formed as well.

(4) In a structure, each vane is formed in an approximately semi-disk shape, is axially supported at a curved portion on the aforementioned housing side, and is provided with the gear portion in a straight portion. In the preferred embodiment, as for a vane shape, an aspect wherein the inside of the housing is close to the approximately spherical shape becomes the most suitable.

(5) In a structure, the operating portion includes a shaft provided with the gear, and the shaft is formed such that a front end side is turnably supported in a pivotal support portion provided in the housing, and a back end side is turnably supported in a pivotal support portion provided in the division plate. In the preferred embodiment, the operating portion includes the shaft with the gear, and a support structure of the shaft can be reliable and simplified as well.

(6) A structure includes the frame member incorporating the housing to be attached to an installation portion through the frame member. The frame member is formed in a shape according to the installation portion. In the preferred embodiment, the structure is not limited to the structure wherein the housing is fixed relative to the frame member, and for example, the structure can be developed to a structure which can turn only by a predetermined angle in a right and left direction of the frame member relative to the frame member so as to more multilaterally vary the airflow direction.

Effect of the Invention

In the present invention, the fin is formed by the pair of vanes so as to be simplified as a vane structure, and the gear mechanism allowing the fin to turn in synchronization with the pair of vanes is simplified as well. As a result, in the airflow-direction adjustment device, the number of members can be reduced, and weight can be reduced so as to become easy to reduce a cost as well. Also, in the structure, the pair of vanes is disposed on the right and left or top and bottom inside the housing, and is turned as the supporting point on the common pivot line set in the plate width direction, so that, for example, even if a large impact is applied, a possibility that both vanes interfere with each other can be easily eliminated.

BRIEF DESCRIPTION OF THE DRAWINGS

FIGS. 3(a), 3(b), 3(c), and 3(d) show the airflow-direction adjustment device in a closed state wherein a fin is disposed top and bottom, wherein

FIGS. 4(a), 4(b), 4(c), and 4(d) show the airflow-direction adjustment device in an open state wherein the fin is horizontal, wherein

FIGS. 5(a), 5(b), 5(c), and 5(d) show the airflow-direction adjustment device in an open state wherein the fin is rotated by approximately 45 degrees, wherein

FIGS. 6(a), 6(b), 6(c), and 6(d) show an outer frame single item of a frame member forming the airflow-direction adjustment device, wherein

FIGS. 7(a), 7(b), 7(c), and 7(d) show a front frame single item of the frame member forming the airflow-direction adjustment device, wherein

FIGS. 8(a), 8(b), 8(c), and 8(d) show a housing single item forming the airflow-direction adjustment device, wherein

FIGS. 9(a) and 9(b) show a relationship of the fin, a division plate, an operating portion, a shaft, and a gear mechanism forming the airflow-direction adjustment device, wherein

BEST MODES OF CARRYING OUT THE INVENTION

Figure 3A:
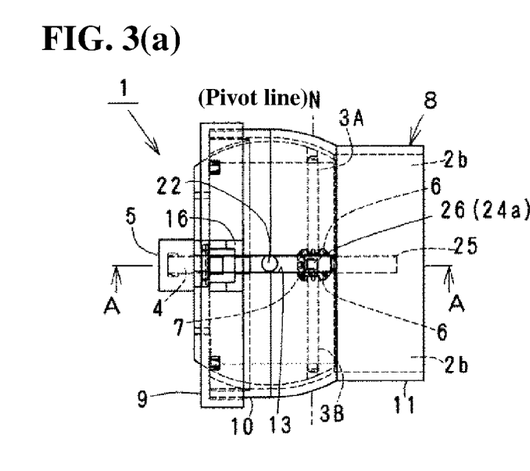
FIG. 3(a) is a top view.
Figure 3B:
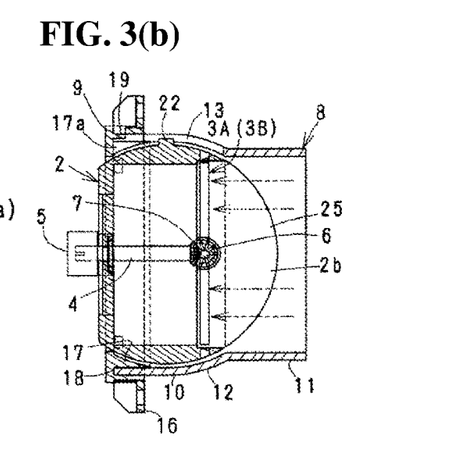
FIG. 3(b) is a cross-sectional view taken along a line A-A in FIG. 3(a)
Figure 3C:
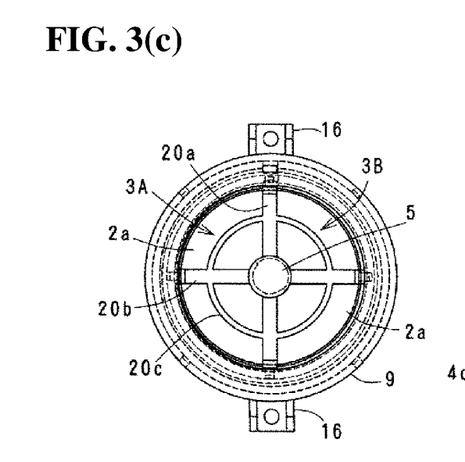
FIG. 3(c) is a front view.
Figure 3D:
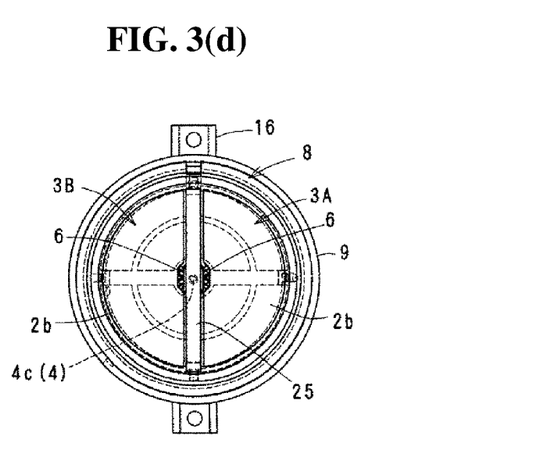
FIG. 3(d) is a rear view.
Figure 4A:
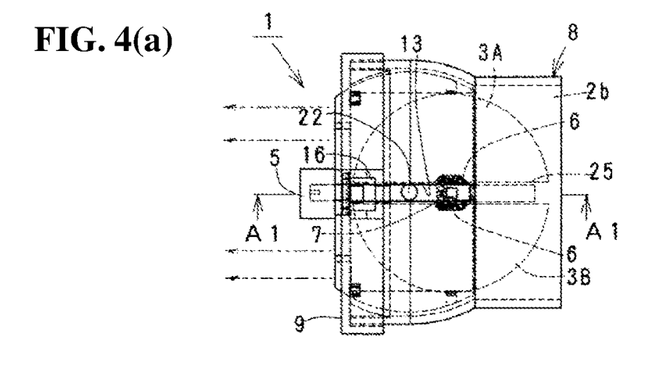
FIG. 4(a) is a top view.
Figure 4B:
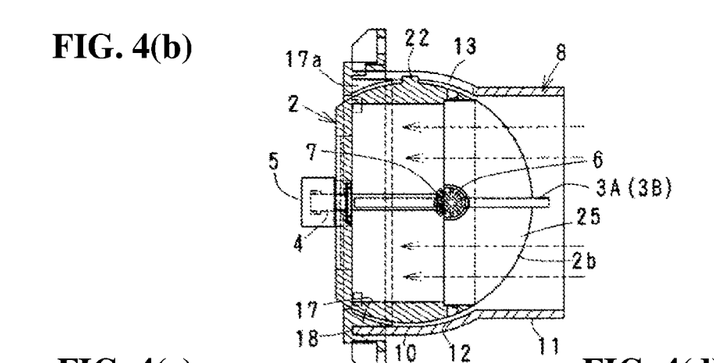
FIG. 4(b) is a cross-sectional view taken along a line A1-A1 in FIG. 4(a)
Figure 4C:
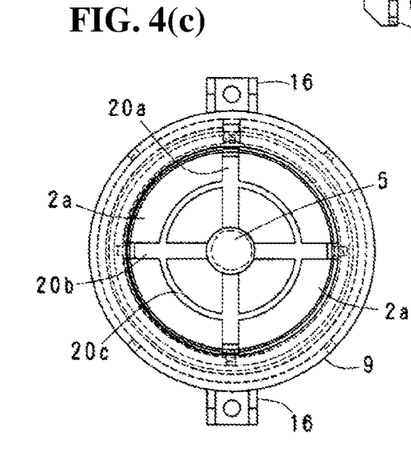
FIG. 4(c) is a front view.
Figure 4D:
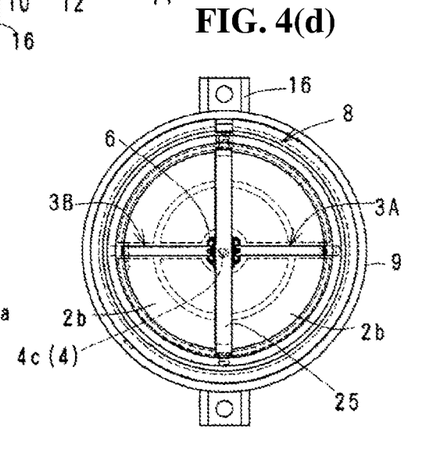
FIG. 4(d) is a rear view.
Figure 5A:
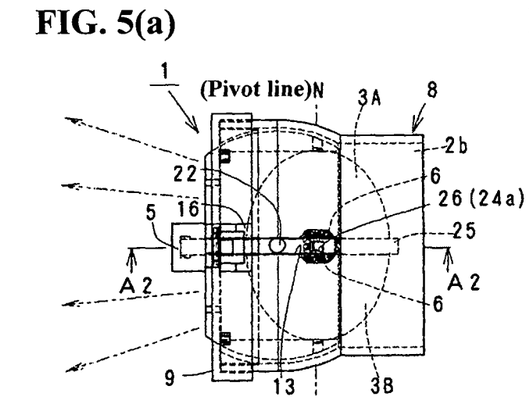
FIG. 5(a) is a top view.
Figure 5B:
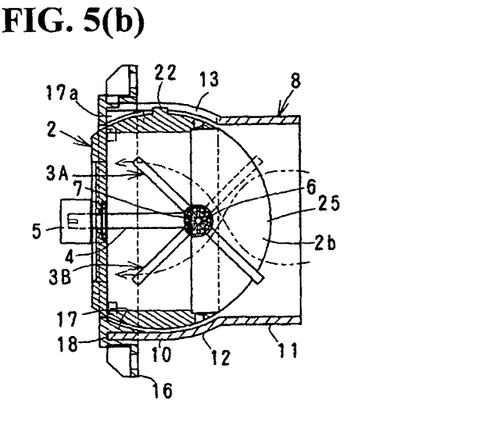
FIG. 5(b) is a cross-sectional view taken along a line A2-A2 in FIG. 5(a)
Figure 5C:
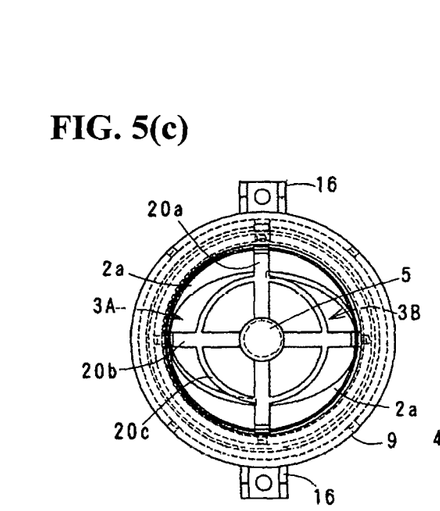
FIG. 5(c) is a front view.

Hereinafter, embodiments of the present invention will be explained with reference to the attached drawings. In the explanation, after a structure and an assembly of an airflow-direction adjustment device are clarified, main operations will be described. Incidentally, in the drawings, FIG. 1 and FIG. 2 are schematic views; and FIG. 3(a) to FIG. 5(d) show an operating state of the airflow-direction adjustment device, and FIGS. 3(b), 4(b), and 5(b) are diagrams showing cross-sectional states taken along a line A-A, a line A1-A1, and a line A2-A2.

Figure 1:
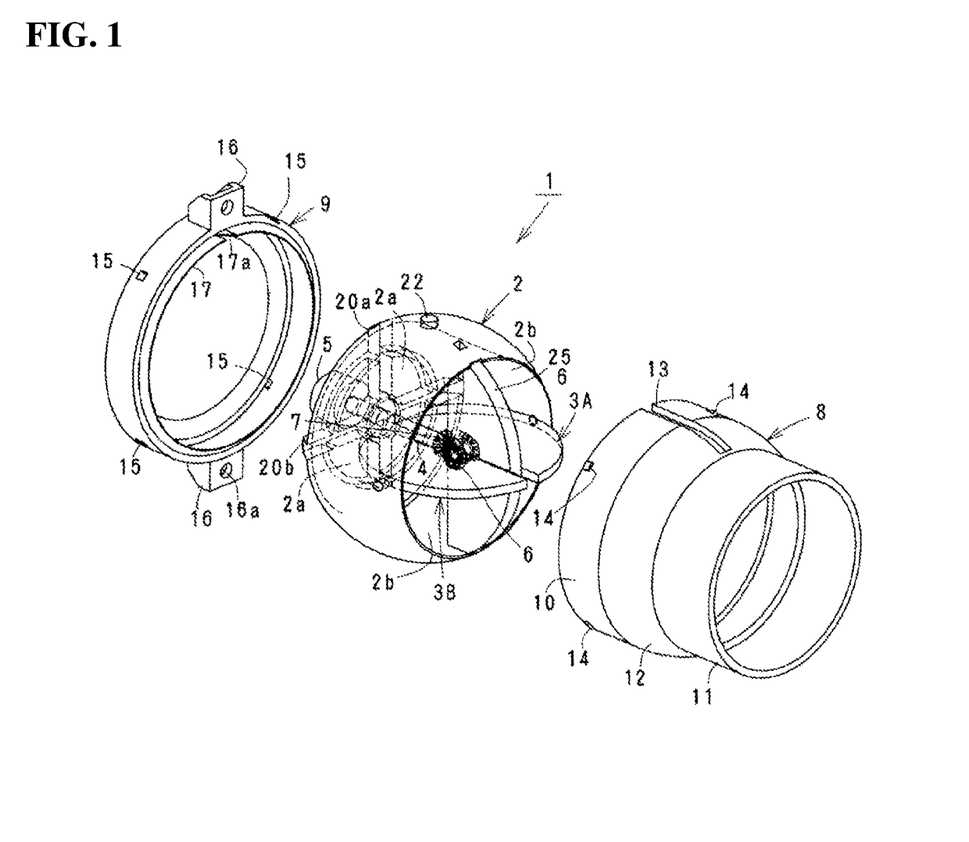
FIG. 1 is a schematic exploded view showing an overall structure of an airflow-direction adjustment device according to an embodiment of the present invention.
Figure 2:
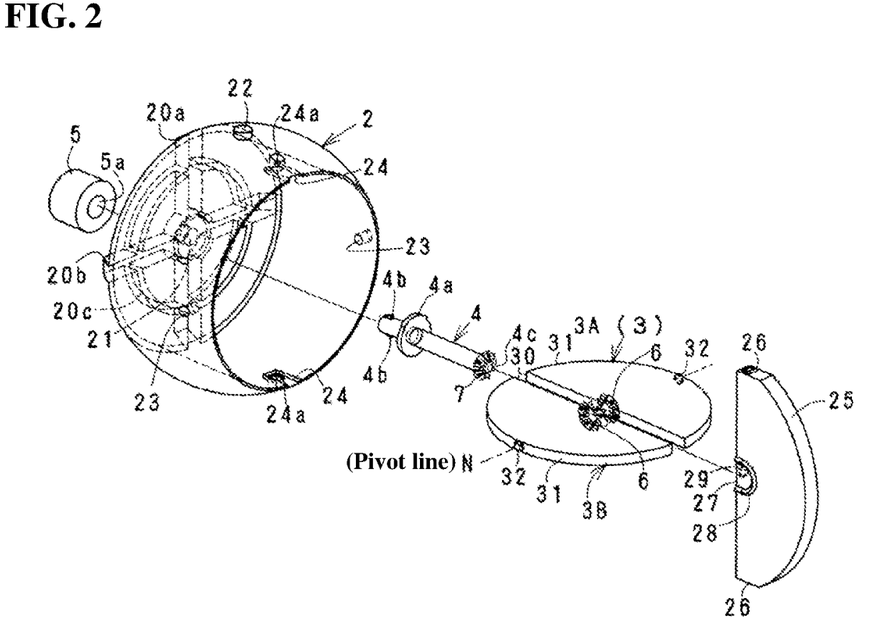
FIG. 2 is a schematic exploded view showing essential parts of the aforementioned airflow-direction adjustment device.

(Structure) As shown in FIG. 1 and FIG. 2, an airflow-direction adjustment device 1 of the embodiments comprises a housing 2 opening front and back ends; a pair of vanes 3A and 3B forming a fin 3 turnably supported inside the housing 2; a gear mechanism allowing an angle or a direction of each vane 3A and 3B to be adjusted; a knob 5 which is an operating portion operating the gear mechanism; and the like. Also, the housing 2 is incorporated inside frame members, i.e. an outer frame 8 and a front frame 9 in an assembly state wherein each vane 3A and 3B, the gear mechanism, the knob 5, and the like are incorporated.

Here, the outer frame 8 and the front frame 9 can be omitted by forming an attachment portion and the like in the housing 2. As for a material, the housing 2, the vanes 3A and 3B, the gear mechanism, the knob 5, the outer frame 8, and the front frame 9 are resin articles; however, those may be made of materials other than a resin.

Figure 8A:
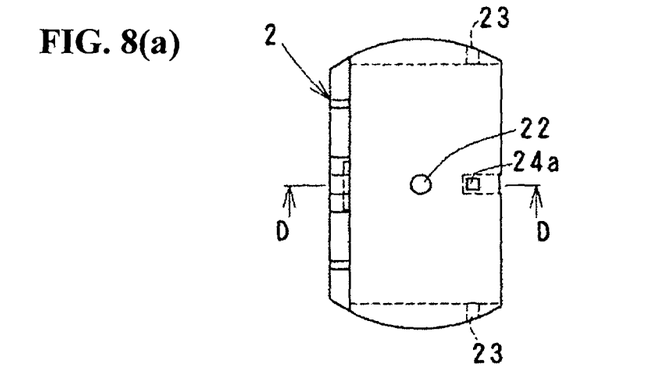
FIG. 8(a) is a top view.
Figure 8B:
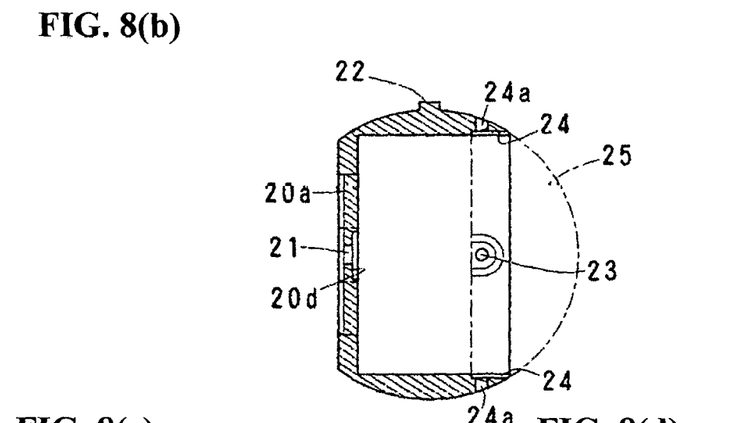
FIG. 8(b) is a cross-sectional view taken along a line D-D in FIG. 8(a)
Figure 8C:
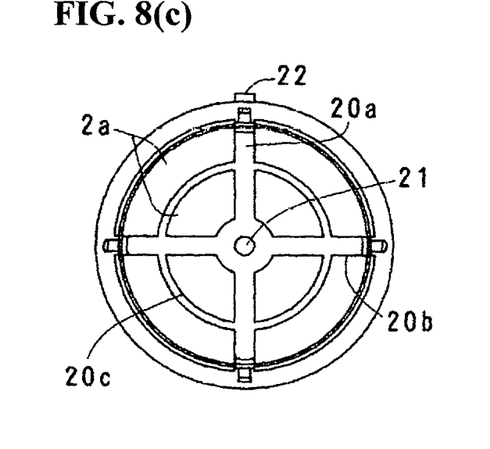
FIG. 8(c) is a front view.
Figure 8D:
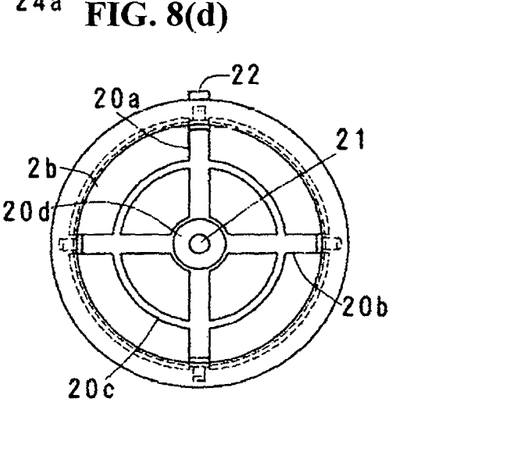
FIG. 8(d) is a rear view.

As shown in FIG. 2 and FIGS. 8(a) to 8(d), the housing 2 has an approximately spherical shape, and an inside is formed in a shape close to a spherical shape wherein the pair of vanes 3A and 3B can turn around a supporting point on a common pivot line N. In the housing 2, a front end side is set as an air outlet 2a, and a back end side is set as an air inlet 2b. As shown in FIG. 8(c), the front end side includes cross-shaped arm portions 20a and 20b; a pivotal support portion 21 provided at a center thereof as a through hole; and a ring portion 20c provided on a concentric circle with the pivotal support portion 21, and connected to the arm portions 20a and 20b. The air outlet 2a is formed between the arm portions 20a and 20b, and the ring portion 20c. On a center inner side of the cross shape, there is formed a concave portion 20d at a portion around the pivotal support portion 21.

On an outer circumference, there is provided a convex portion 22 at an approximately intermediate portion of front and back. At the back end side, there are provided a pair of shaft holes 23 penetrating on the pivot line N; a pair of engagement holes 24a penetrating in a direction intersecting the pivot line N; and positioning portions 24 for a partition plate wherein an inner face of each engagement hole 24a is lowered by one step. Among those, in each shaft hole 23, there are fitted shaft portions 32 of the later-described vanes 3A and 3B. A partition plate 25 shown with imaginary lines in FIG. 8(b) is positioned to be disposed in each positioning portion 24.

The partition plate 25 is a partition dividing a back inner side of the housing 2 into two. Namely, the partition plate 25 has a semi-disk shape which is one size larger than that of the vanes 3A and 3B, and upper and lower portions where a curved portion and a straight portion intersect are horizontally cut (see FIG. 2), and there are included claws 26 provided in each cut face thereof. Also, the partition plate 25 includes a concave-shaped pivotal support portion 29 provided in a middle of top and bottom or right and left of (an end face of) the straight portion; and cavities 28 respectively provided on both side faces, and wherein a portion close to the pivotal support portion 29 is lowered by one step, and which is rimed with a semicircular rib 27. Then, in the aforementioned partition plate 25, each claw 26 is engaged with the engagement hole 24a to be mounted inside the housing 2. In a mounting state of the partition plate 25, the inside of the housing 2 is divided into two to right and left or top and bottom by the partition plate 25 up to a vicinity of the pivot line N from a back side of the housing 2.

Figure 5D:
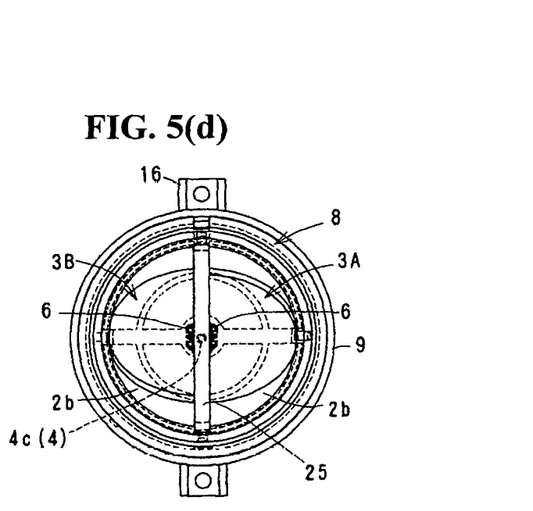
FIG. 5(d) is a rear view.
Figure 6A:
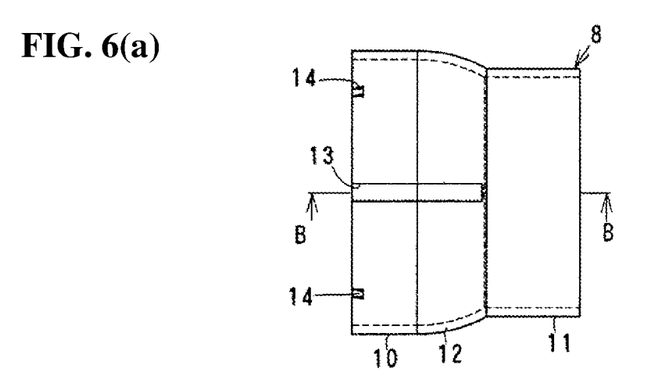
FIG. 6(a) is a top view.
Figure 6B:
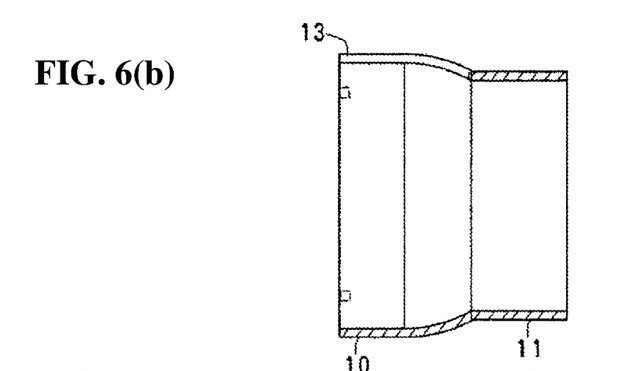
FIG. 6(b) is a cross-sectional view taken along a line B-B in FIG. 6(a)
Figure 6C:
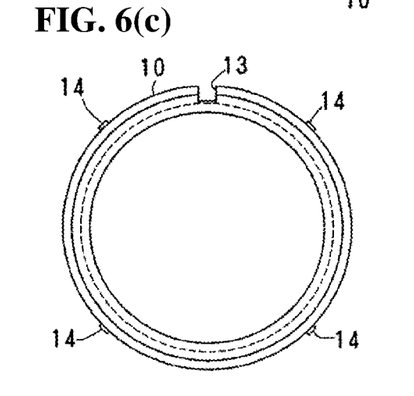
FIG. 6(c) is a front view.
Figure 6D:
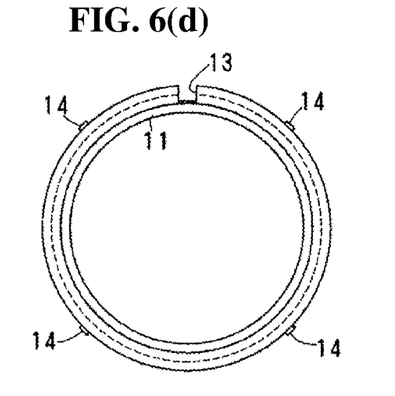
FIG. 6(d) is a rear view.
Figure 7A:
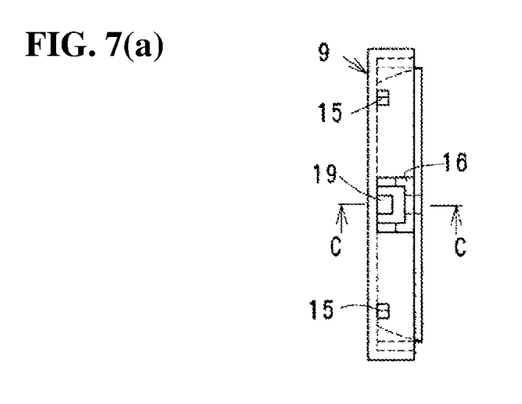
FIG. 7(a) is a top view.
Figure 7B:
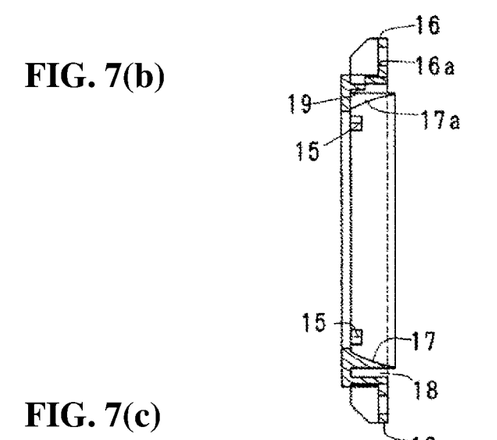
FIG. 7(b) is a cross-sectional view taken along a line C-C in FIG. 7(a)
Figure 7C:
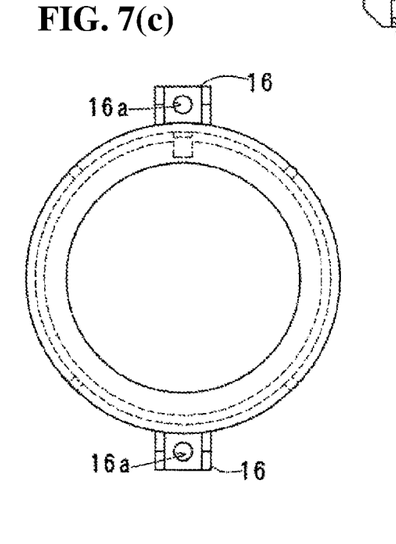
FIG. 7(c) is a front view.
Figure 7D:
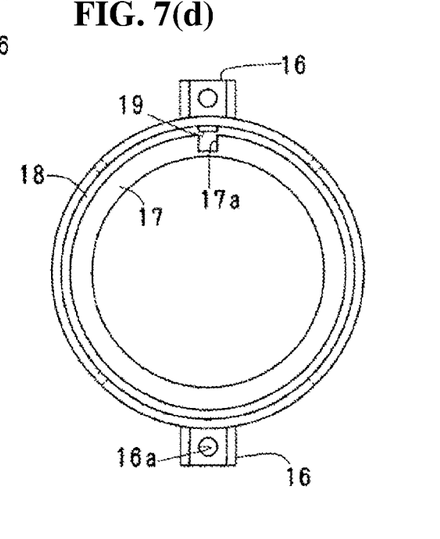
FIG. 7(d) is a rear view.

Consequently, in the structure, in a state without the vanes 3A and 3B, the air is sucked into the housing from two portions divided as the inlet 2b of the housing 2, and flows in a direction of the outlet 2a, or in a state including the vanes 3A and 3B, the air becomes two flows on one side and four flows on both sides according to the angle of each vane 3A and 3B through the inlet 2b at the two portions divided as shown in FIG. 5(d) to flow in a direction of the outlet 2a in a state close to a swirl flow.

Figure 9A:
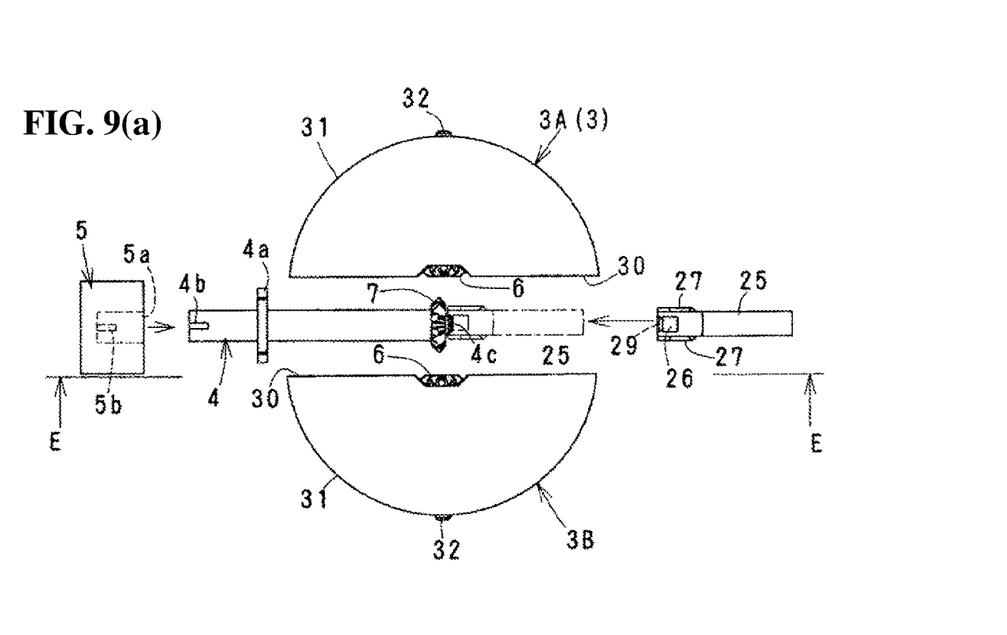
FIG. 9(a) is a top view.
Figure 9B:
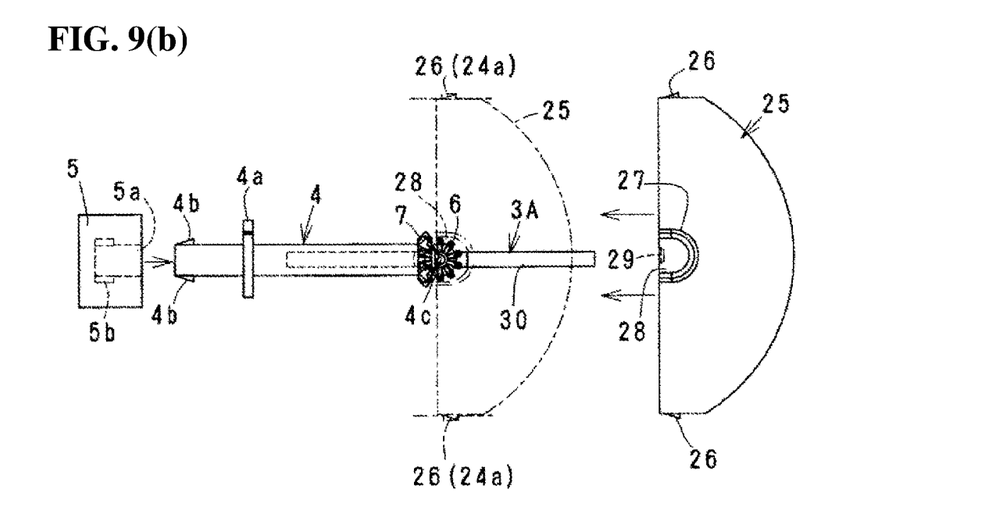
FIG. 9(b) is a view seen from an E-E line direction in FIG. 9(a).

Namely, as shown in FIG. 2 and FIGS. 9(a) and 9(b), the vanes 3A and 3B have an approximately semi-disk shape, and include the shaft portions 32 for a pivot projected at a middle of curved portions 31 of the vanes; and gear portions 6 integrally formed in a middle of straight portions 30 of the vanes. The shaft portion 32 and the gear portion 6 are provided on the aforementioned pivot line N. Also, the shaft portion 32 of each vane is fitted into the corresponding shaft hole 23 of the housing 2, and the gear portion 6 of each vane engages one portion of a gear 7 provided on a back end side of a shaft 4 respectively.

Thereby, each vane 3A and 3B is disposed on right and left or top and bottom by sandwiching the partition plate 25 inside the housing 2, and supported turnably in a front-and-back direction as the supporting point of the common pivot line N (the shaft portion 32 and the gear portion 6 provided on the pivot line).

In that case, the shaft 4 includes a flange portion 4a provided slightly just in front of a front end; a pair of claws 4b provided around the shaft just in front of the flange portion 4a; the gear 7 integrally formed at the back end side, and engaging each gear portion 6; and a protrusion 4c projected on an outer end face of the gear 7. The claws 4b engage a locking hole portion 5b connected to a hole portion 5a when the claws 4b are inserted into the hole portion 5a of the knob 5. The gear 7 and the gear portion 6 only have to have a relationship of transmitting a rotational movement between intersecting two shafts. Usually, the gear 7 and the gear portion 6 are formed by a bevel gear such as a timer gear, a spiral bevel gear, an oblique gear, and the like.

In the aforementioned shaft 4, in a state wherein a front end side is inserted into the through hole of the aforementioned pivotal support portion 21, and the flange portion 4a is fitted into the concave portion 20d inside the pivotal support portion 21, the knob 5 which is the operating portion is mounted on a projecting portion inserted outwardly through the aforementioned through hole. Then, in the shaft 4, in a state retained by the flange portion 4a and the knob 5, a back side portion is disposed between the vane 3A and the vane 3B, and the gear 7 is engaged with the gear portion 6 of each vane.

On the other hand, as shown in FIG. 1, FIGS. 3(a) to 3(d), and FIGS. 6(a) to 6(d), the outer frame 8 is a main member portion of the frame member, and the inside has a shape into which the housing 2 can fit. Namely, the outer frame 8 is formed by a large-diameter cylinder portion 10 on a front side; a small-diameter cylinder portion 11 on a back side; and a curved-face cylinder portion 12 in a middle therebetween. In the large-diameter cylinder portion 10 and the curved-face cylinder portion 12, there is provided a straight guide groove 13 guiding the convex portion 22 of the housing 2. In the large-diameter cylinder portion 10, there are provided protrusions 14 at four portions at equal intervals on the circumference of the large-diameter cylinder portion 10.

As shown in FIGS. 7(a) to 7(d), the front frame 9 is formed by an approximately ring shape connected to the outer frame 8. In the front frame 9, there are provided four engagement holes 15 corresponding to the protrusions 14; two attachment pieces 16 protruding between the engagement holes 15; an inner flange portion 17 forming a circular gap 18 between the inner flange portion 17 and an outer circumference; and a positioning small protrusion 19 protruding inside the gap 18, and engaging the guide groove 13 of the outer frame. Incidentally, the reference sign 17a is a die-cutting notch corresponding to the small protrusion 19.

(Assembly) Hereinafter, one example of an assembly procedure of the aforementioned respective members will be explained. In the example, as shown in FIG. 1 and FIG. 2, after the shaft 4 is incorporated relative to the housing 2 through the knob 5, the vanes 3A and 3B, and the partition plate 25 are assembled.

For further details, first, in the shaft 4, when the front end side is inserted into the through hole of the pivotal support portion 21 through the housing from the flange portion 4a, the flange portion 4a comes to a state wherein the flange portion 4a fits into the concave portion 20d. After that, the knob 5 is mounted on the front end side of the shaft 4 protruding to an outside of the pivotal support portion 21. In that case, after the pair of claws 4b is inserted into the hole portion 5a of the knob 5, the pair of claws 4b engages the locking hole portion 5b connected to the hole portion 5a. Thereby, the knob 5 is mounted on the shaft 4. The shaft 4 is turnably supported by the pivotal support portion 21 in a state wherein a front side is retained through the flange portion 4a and the knob 5.

Next, the partition plate 25 is assembled to the housing 2. In that case, in the partition plate 25, upper and lower cut portions fit into the positioning portions 24 relative to the back inner side of the housing 2, and each claw 26 is engaged with the engagement hole 24a, so that the partition plate 25 is mounted on the housing 2. In the mounting state of the partition plate 25, in the shaft 4, the protrusion 4c on a back end face fits into the pivotal support portion 29 of the partition plate 25, so that the shaft 4 is turnably supported in the fitting state of a back side.

Next, the vanes 3A and 3B are turnably assembled to the housing 2. In that case, in the vane 3A and the vane 3B, the shaft portion 32 fits into the corresponding shaft hole 23 on a housing side, and the gear portion 6 is engaged with the gear 7. At that time, in the gear portion 6, as presumed from FIG. 9(b), in a state wherein one portion is engaged with the gear 7, the remaining portions enter into the cavity 28 of the partition plate 25 to be released. In the assembly state, each vane 3A and 3B can turn in the front-and-back direction of the housing as the supporting point of the shaft portion 32 and the gear portion 6 disposed on the aforementioned pivot line N.

As mentioned above, an assembly member itself wherein the shaft 4, the knob 5, the partition plate 25, and the vanes 3A and 3B are assembled relative to the housing 2 can be used as the airflow-direction adjustment device 1; however, in the example, the assembly member thereof is used as the airflow-direction adjustment device 1 in an aspect wherein the assembly member thereof is disposed inside the outer frame 8 and the front frame 9 which are the frame members. In that case, in the aforementioned assembly member, as shown in FIG. 1, and FIGS. 3(a) to 3(d), after the assembly member is inserted into the outer frame in a state wherein the convex portion 22 of the housing 2 fits into the guide groove 13 relative to the outer frame 8, the front frame 9 is connected to the outer frame 8, so that the assembly member is disposed inside both frames 8 and 9. At that time, in the front frame 9, an end side of the large-diameter cylinder portion 10 fits into the gap 18 relative to the outer frame 8, and simultaneously, when the small protrusion 19 is approached to fit into the guide groove 13, each protrusion 14 engages the corresponding engagement hole 15 to be connected. Thereby, the assembly member is completed as the airflow-direction adjustment device 1 shown in FIG. 1, and FIG. 3(a) to FIG. 5(d).

(Operations) Hereinafter, the main operations of the airflow-direction adjustment device 1 made as mentioned above will be described.

(1) FIGS. 3(a) to 3(d) show a closed state wherein each vane 3A and 3B is disposed to turn on the pivot line N, i.e. up and down or in a vertical direction as the supporting point of the shaft portion 32 and the gear portion 6 to close between the air outlet 2a and the air inlet 2b. Therefore, in the closed state, the air sucked into the air inlet 2b is inhibited from flowing toward the air outlet 2a by each vane 3A and 3B.

(2) FIGS. 4(a) to 4(d) show an open state, for example, wherein each vane 3A and 3B is turned approximately by 90 degrees on the pivot line N, i.e. as the supporting point of the shaft portion 32 and the gear portion 6 by a turning operation of the knob 5 to be switched approximately horizontally from the closed state in FIGS. 3(a) to 3(d). In the switchover, each vane 3A and 3B is rotated relatively in an opposite direction through an engagement between the gear 7 on the gear mechanism, i.e. a shaft side, and the gear portion 6 on each vane 3A and 3B side. Then, in the open state, the air sucked into the air inlet 2b flows to an air outlet 2a side in a state divided into right and left at the partition plate 25, and further divided into top and bottom by the vanes 3A and 3B on both sides so as to be blown out to an outside approximately as a horizontal flow through a gap formed between the arm portions 20a and 20b, and the ring portion 20c.

(3) FIGS. 5(a) to 5(d) show the open state, for example, wherein each vane 3A and 3B is turned approximately by 45 degrees on the pivot line N, i.e. as the supporting point of the shaft portion 32 and the gear portion 6 by the turning operation of the knob 5 to be switched obliquely from the closed state in FIGS. 3(a) to 3(d). In the switchover, each vane 3A and 3B is rotated relatively in the opposite direction through the engagement between the gear 7 on the gear mechanism, i.e. the shaft side, and the gear portion 6 on each vane 3A and 3B side to be disposed in an X shape. Consequently, in the open state, the air sucked into the air inlet 2b is divided into the right and left at the partition plate 25, and flows in an airflow direction in an X direction in addition to a change of the airflow direction on a curved surface inside the housing 2 by the vanes 3A and 3B disposed in the X shape on both sides, and furthermore, becomes a mild swirl flow to be blown out. Obviously, the airflow direction in the X direction, or the swirl flow slightly varies according to the angle of each vane 3A and 3B.

(4) In the aforementioned airflow-direction adjustment device 1, the fin is formed by the pair of vanes 3A and 3B so as to be simplified as a vane structure, and the gear mechanism synchronizing each vane 3A and 3B to turn is simplified as well. As a result, in the airflow-direction adjustment device 1, the number of members can be reduced, and weight can be reduced so as to become easy to reduce a cost as well. Also, in the structure, the pair of vanes 3A and 3B is disposed on the right and left or top and bottom inside the housing 2, and is turned as the supporting point on the common pivot line N set in a plate width direction, so that, for example, even if a large impact is applied, a possibility that both vanes interfere with each other can be easily eliminated so as to improve durability as well.

(5) Simultaneously, the airflow-direction adjustment device 1 is switched from the closed state in FIGS. 3(a) to 3(d) wherein the vanes 3A and 3B are rotated in the opposite directions through the engagement between the gear 7 on the gear mechanism, i.e. the shaft side, and the gear portion 6 on each vane 3A and 3B side so as to almost inhibit a flow of air toward the air outlet 2a side, to the open state in FIGS. 4(a) to 4(d), FIGS. 5(a) to 5(d), and the like which allows the flow of air and varies the airflow direction. Consequently, as for structure characteristics, even with a few vanes, i.e. the pair of vanes 3A and 3B for an airflow-direction adjustment, the vanes can multilaterally vary.

(6) Simultaneously, in the airflow-direction adjustment device 1, the gear mechanism, for turning a plurality of vanes in synchronization with a rotation of an operating portion such as the knob 5 and the like, is formed by the gear portion 6 provided on the pivot line N of each vane 3A and 3B; and the gear 7 is integrally rotated with the knob 5, and engaged with the gear portion 6 of each vane. Accordingly, the vanes 3A and 3B can easily rotate in the opposite direction, and compared to the Patent Document 2, the airflow-direction adjustment device 1 can be simplified, and compared to a structure wherein both gear portions of the pedestal are directly engaged as shown in the Patent Document 1, an excellent engagement state can be easily maintained.

(7) Simultaneously, in the airflow-direction adjustment device 1, each vane 3A and 3B has approximately the semi-disk shape, the curved portion 31 is axially supported on a housing 2 side, and the gear portion 6 is provided in the straight portion 30, so that a vane shape becomes the most suitable for an aspect wherein the inside of the housing 2 is close to the approximately spherical shape, and the partition plate 25 can be easily added as well. Incidentally, the partition wall 25 may be omitted (in that case, the protrusion 4c provided in the shaft 4 becomes unnecessary as well), Also, the knob 5 which is the operating portion is mounted on the shaft 4 with the gear 7. The shaft 4 is easily and reliably supported by the pivotal support portion 21 on the housing side and the pivotal support portion 29 on a partition plate 25 side.

Incidentally, in the airflow-direction adjustment device of the present invention, the details can be modified or developed with reference to the aforementioned explanation provided that they comprise a structure specified in the first aspect. As for one example, there is shown the embodiment wherein the housing is positioned to be fixed in the frame members; however, for example, relative to the frame members, a turning groove may be provided in a circumferential direction of the frame members or the outer frame from the guide groove 13 so as to turn to the right and left along the turning groove only by a predetermined angle to carry out the airflow-direction adjustment further multilaterally.

Incidentally, all contents of the specification, claims, drawings, and abstract of Japanese Patent Application No. 2013-239461 filed on Nov. 20, 2013 are cited in their entireties herein and are incorporated as a disclosure of the specification of the present invention.

What is claimed is:

1. An airflow-direction adjustment device, comprising:
a housing having an approximately spherical shape and including a first opening at a front end side as an air outlet and a second opening at a back end side as an air inlet;
a fin turnably supported inside the housing, and including a pair of vanes arranged adjacent to each other in the housing, the pair of vanes having shaft portions turnably connected to the housing and defining a pivot line about which the pair of vanes turns, wherein an inner surface of each of the pair of vanes is a straight surface, an outer surface of each of the pair of vanes is a curved surface corresponding to an interior surface of the housing, and the shaft portion of each of the pair of vanes extends radially outwardly from a center of the curved surface;
a partition plate disposed between the pair of vanes and dividing the housing into two, wherein the partition plate is connected to the housing and disposed between the pair of vanes from a vicinity of the pivot line to the back end side, and the shaft is disposed between the pair of vanes from the front end side to the vicinity of the pivot line;
a gear mechanism including gear portions provided on the pivot line of the pair of vanes for adjusting a direction of the fin;
an operating portion connected to the gear mechanism and arranged rotatably for operating the gear mechanism, wherein a rotation of the operating portion is transferred to the gear portions of the gear mechanism so that each of the pair of vanes turns in a front-and-back direction to adjust the direction of the fin, and
a shaft extending in the housing in the front-and-back direction and having one end connected to the operating portion and another end including a gear to engage the gear portions,
wherein the gear portions are arranged on the inner surfaces of the pair of vanes facing each other and the gear of the shaft is arranged between the gear portions to engage thereto,
when the operating portion is rotated in one direction to operate the pair of vanes, the pair of vanes rotates about the pivot line so that one of the pair of vanes rotates toward front in the front-and-back direction and the other of the pair of vanes rotates back in the front-and-back direction, and
when the operating portion is rotated in another direction opposite to the one direction, the pair of vanes rotates about the pivot line so that the one of the pair of vanes rotates toward back in the front-and-back direction and the other of the pair of vanes rotates forward in the front-and-back direction.

* * * * *